US012569708B2

(12) United States Patent
Watson et al.

(10) Patent No.: US 12,569,708 B2

(45) **Date of Patent: *Mar. 10, 2026**

(54) PROTECTION AND INSTALLATION DEVICE FOR FIRE PROTECTION SPRINKLER

(71) Applicant: Minimax Viking Patent Management GmbH, Bad Oldesloe (DE)

(72) Inventors: Jason T. Watson, Hastings, MI (US); Shawn J. Feenstra, Caledonia, MI (US); Derek John Scheffers, Mattawan, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 442 days.

This patent is subject to a terminal disclaimer.

(21) Appl. No.: 17/948,843

(22) Filed: Sep. 20, 2022

(65) Prior Publication Data

US 2023/0101096 A1 Mar. 30, 2023

Related U.S. Application Data

(60) Provisional application No. 63/249,253, filed on Sep. 28, 2021.

(51) Int. Cl.
*A62C 37/11* (2006.01)

(52) U.S. Cl.
CPC .................................... *A62C 37/11* (2013.01)

(58) Field of Classification Search
CPC ......... A62C 31/02; A62C 31/28; A62C 35/68; A62C 37/08; A62C 37/10; A62C 37/11; A62C 37/12; A62C 37/14; A62C 37/16; A62C 37/20; A62C 99/009; B05B 15/14; B05B 15/16; B05B 15/18
See application file for complete search history.

(56) References Cited

U.S. PATENT DOCUMENTS

| | | | |
|---|---|---|---|
| 4,176,756 | A | 12/1979 | Gellman |
| 6,098,256 | A | 8/2000 | Poussard |
| 6,487,942 | B1 | 12/2002 | Carter et al. |
| 6,669,111 | B2 | 12/2003 | Vinson et al. |
| 7,055,614 | B1 | 6/2006 | Ide |

(Continued)

FOREIGN PATENT DOCUMENTS

| | | | |
|---|---|---|---|
| CN | 205730068 U * | 11/2016 | ............. A62C 31/02 |
| GB | 126753 | 5/2019 | |
| KR | 101900039 B1 * | 9/2018 | ............. B05B 15/16 |

*Primary Examiner* — Darren W Gorman
(74) *Attorney, Agent, or Firm* — Perkins Coie LLP

(57) ABSTRACT

A method and device for protecting and installing a fire protection sprinkler. The method includes torquing the sprinkler with a protective device strapped about the sprinkler and pulling a releasing segment of the device to expose operational components of the installed sprinkler. The protective device includes a first and second member having a hinged connection about which the members pivot with respect to one another between an open configuration and a closed configuration. At least one of the members includes a torque assist portion for applying the torque to the sprinkler and a releasing segment spaced laterally from the hinge connection to pivot the members from the closed configuration to the open configuration and release the protective device from the sprinkler.

37 Claims, 6 Drawing Sheets

(56) References Cited

U.S. PATENT DOCUMENTS

| | | | |
|---|---|---|---|
| 7,185,567 B2 | 3/2007 | Ide | |
| 7,273,189 B2 | 9/2007 | Ide et al. | |
| 7,540,330 B2 | 6/2009 | Orr et al. | |
| 7,757,967 B1 | 7/2010 | Yang | |
| 7,891,716 B2 | 2/2011 | Orr et al. | |
| 7,900,852 B2 | 3/2011 | Feenstra | |
| 8,297,663 B2 | 10/2012 | Spears | |
| 8,469,111 B2 | 6/2013 | Orr et al. | |
| 8,662,191 B2 | 3/2014 | Orr et al. | |
| 8,905,151 B2 | 12/2014 | Silva, Jr. et al. | |
| 9,027,660 B2 | 5/2015 | Oldham | |
| 9,320,929 B2 | 4/2016 | Koiwa | |
| 9,463,343 B2 | 10/2016 | Koiwa | |
| 9,630,039 B2 | 4/2017 | Koiwa | |
| 10,376,724 B2 | 8/2019 | Macomber | |
| 10,737,371 B2 | 8/2020 | Watson et al. | |
| 10,744,527 B2 | 8/2020 | Jackson | |
| 10,940,348 B2 | 3/2021 | Oldham et al. | |
| 10,940,349 B2 | 3/2021 | Schnell et al. | |
| 11,160,999 B2 | 11/2021 | Koiwa | |
| 11,872,425 B2 | 1/2024 | Feenstra et al. | |
| 12,157,022 B2 | 12/2024 | Watson et al. | |
| 12,257,465 B2 | 3/2025 | Feenstra et al. | |
| 12,330,001 B1 | 6/2025 | Feenstra et al. | |
| 2005/0035022 A1* | 2/2005 | Ide | B65D 61/00 206/528 |
| 2007/0256844 A1 | 11/2007 | Blasing et al. | |
| 2012/0255629 A1* | 10/2012 | Goss | A62C 35/68 137/377 |
| 2012/0267453 A1* | 10/2012 | DeVaney | A62C 31/28 239/288.5 |
| 2019/0175968 A1 | 6/2019 | Pressnell | |
| 2022/0203395 A1 | 6/2022 | Pleyte et al. | |
| 2022/0226683 A1* | 7/2022 | Ouellette | A62C 35/68 |
| 2023/0087195 A1 | 3/2023 | Workman et al. | |
| 2023/0088036 A1 | 3/2023 | Feenstra et al. | |
| 2023/0089748 A1 | 3/2023 | Watson et al. | |
| 2023/0090915 A1 | 3/2023 | Scheffers et al. | |
| 2023/0100701 A1 | 3/2023 | Feenstra et al. | |
| 2024/0198151 A1 | 6/2024 | Feenstra et al. | |
| 2025/0050151 A1 | 2/2025 | Watson et al. | |

* cited by examiner

PROTECTION AND INSTALLATION DEVICE FOR FIRE PROTECTION SPRINKLER

PRIORITY DATA & INCORPORATION BY REFERENCE

This application claims the benefit of priority to U.S. Provisional Patent Application No. 63/249,253, filed on Sep. 28, 2021, which is incorporated by reference in its entirety.

TECHNICAL FIELD

The present invention relates generally to protection devices and installation tools for fire protection sprinklers and systems. In particular, the present invention relates to a protective cover and installation device for fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflection member. In other types of controlled sprinklers, the trigger and/or seal is operated or otherwise ejected by a mechanical, electrical or computer-controlled actuator.

The response and actuation of the sprinkler is based upon the thermally responsive trigger or actuator; and the spray pattern or distribution of the firefighting fluid is defined by the fluid deflection member configuration. Accordingly, proper sprinkler performance is a function of these operative components. In order to maintain the expected performance of the sprinkler, there is a need to protect the automatic fire protection sprinkler from unintended impact and/or damage. Known fire protection covers are shown and described in U.S. Pat. Nos. 6,669,111; 7,540,330; 7,757,967; and 7,900,852. Generally, these known protective devices are either axially disposed over the sprinkler to protect the fluid deflection member and the thermally responsive trigger. Alternatively, the protective device is strapped about the sprinkler frame between the frame body and the fluid protection member to protect the thermally responsive trigger. These known protective sprinkler covers are made from plastic and are affixed about the sprinkler to protect the sprinkler during storage, transport, handling and/or during the installation process. Once the sprinkler is properly installed in the branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is be applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663 and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torquing the sprinkler to form a fluid tight seal. The presence of a known protective device on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. Accordingly, there is a need for sprinkler protective devices that can protect operative components of the sprinkler during storage, transport handling and installation; transfer a torque or rotational force to form a fluid tight sealed connection between a sprinkler and a branch connector; and be easily removable in order to place the sprinkler into service.

DISCLOSURE OF THE INVENTION

Preferred embodiments of a method are provided for protecting and installing an automatic fire protection sprinkler assembly having a preferred frame with a body and a pair of spaced apart frame arms in a plane and extending from the body with a fluid deflection member coupled to the frame arms and spaced from the body with a thermally responsive trigger assembly coaxially disposed between the body and the fluid deflection member. The preferred method includes torquing the sprinkler assembly into a branch connector with a protective device strapped about the sprinkler; and pulling a releasing segment of the strapped protective device to expose operational components of the installed sprinkler. Preferably, the torquing is performed by hand and is sufficient to form a fluid tight seal between the sprinkler and the branch connector. Preferred embodiments of the method include pulling a planar releasing segment of the protective device that extends parallel to the plane in order to open the strapped device and releasing the device from the sprinkler.

Preferred embodiments of a protected fire protection sprinkler assembly are also provided. One preferred embodiment of a protected fire protection sprinkler assembly includes a fire protection sprinkler including a body having an inlet, an outlet, an internal passageway extending between the inlet and the outlet along a central sprinkler axis, and an external thread formed about the central sprinkler axis. The fire protection sprinkler includes a pair of frame arms extending axially from the body and converging toward one another to preferably form an apex centered along the central sprinkler axis and spaced axially from the outlet. The fire sprinkler includes a thermally responsive trigger assembly extending along the central axis, a fluid deflection member preferably affixed to the apex and centered along the central sprinkler axis with the apex between the thermally responsive trigger assembly and the fluid deflection member. The preferred assembly includes a protection and installation device strapped about the fire protection sprinkler. The preferred protective device is strapped about the fire protection sprinkler to at least partially surround the thermally responsive trigger. The protective device includes a first protective member and a second protective member opposed from one another about the plane with at least one of the first and second protective members including an external torque assist surface of the protective device. A hinge connection is provided between the first and second protective member to pivot the first and second protective members with respect to one another between a closed configuration and an open configuration. The device preferably includes a releasable lock arrangement to lock the first and second protective members in the closed configuration. The device also preferably includes at least one releasing segment to release the lock arrangement and pivot the first and second protective members from the closed configuration to the open configuration.

Preferred embodiments of a protective device provide a preferred protective installation device for a fire protection sprinkler. The preferred protective device includes a first member and a second member with a hinge connection therebetween that defines a hinge axis about which the first and the second members pivot with respect to one another from an open configuration to a closed configuration. In the closed configuration, the first and the second members are opposed to one another about a plane to define an internal void along a device axis for housing at least a portion of a fire protection sprinkler. Preferably, the protective installation device houses the thermally responsive trigger assembly of the fire protection. Each of the first and the second members of the device have a first lateral end and a second lateral end. Moreover, at least one of the first member and the second members preferably includes a torque assist portion at the first lateral end for applying a torque to the housed sprinkler and a releasing segment spaced laterally from the hinge connection to pivot the first and the second members with respect to one another about the hinge axis from the closed configuration to the open configuration.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
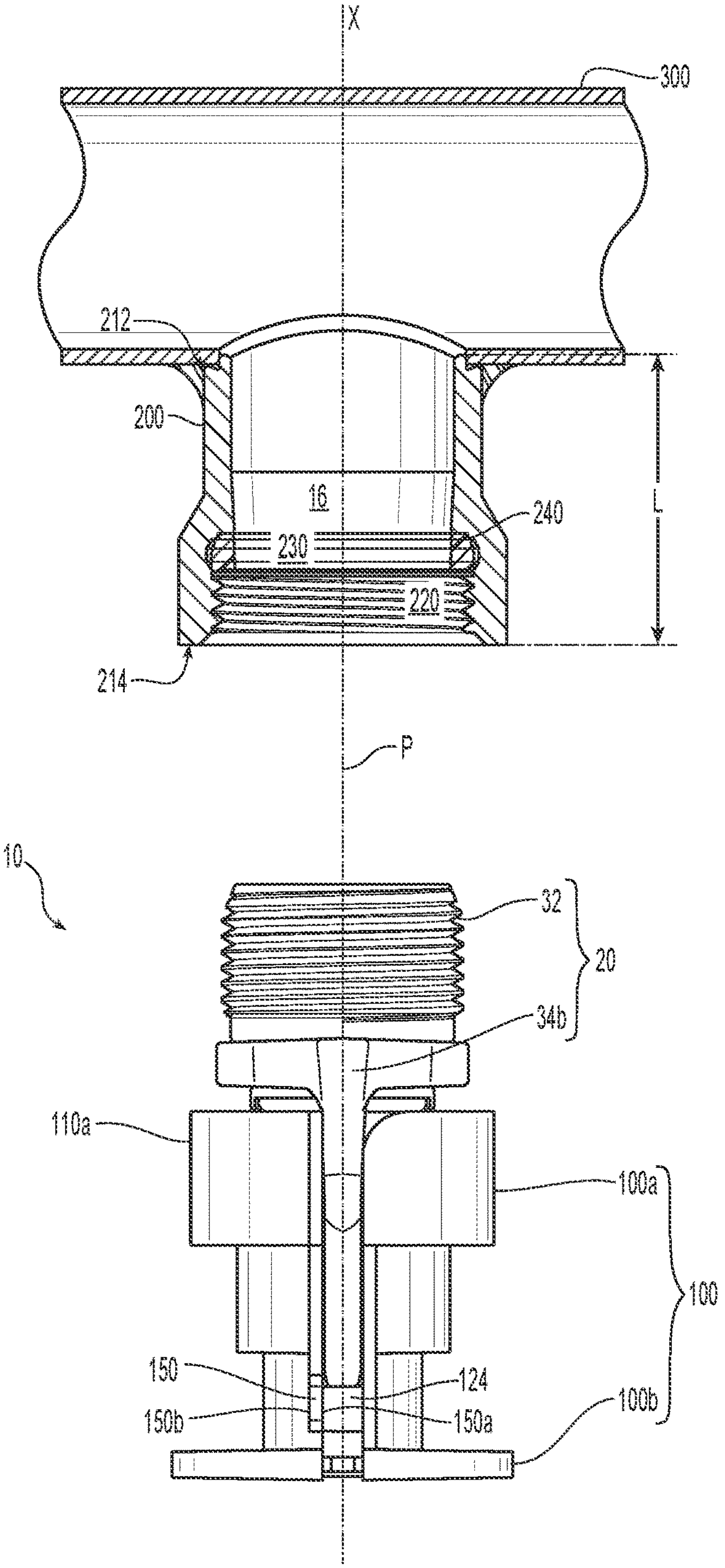
FIG. 1A is a partial cross-sectional exploded view of a preferred embodiment of a protected sprinkler assembly coupled to a branch connector.
Figure 4:
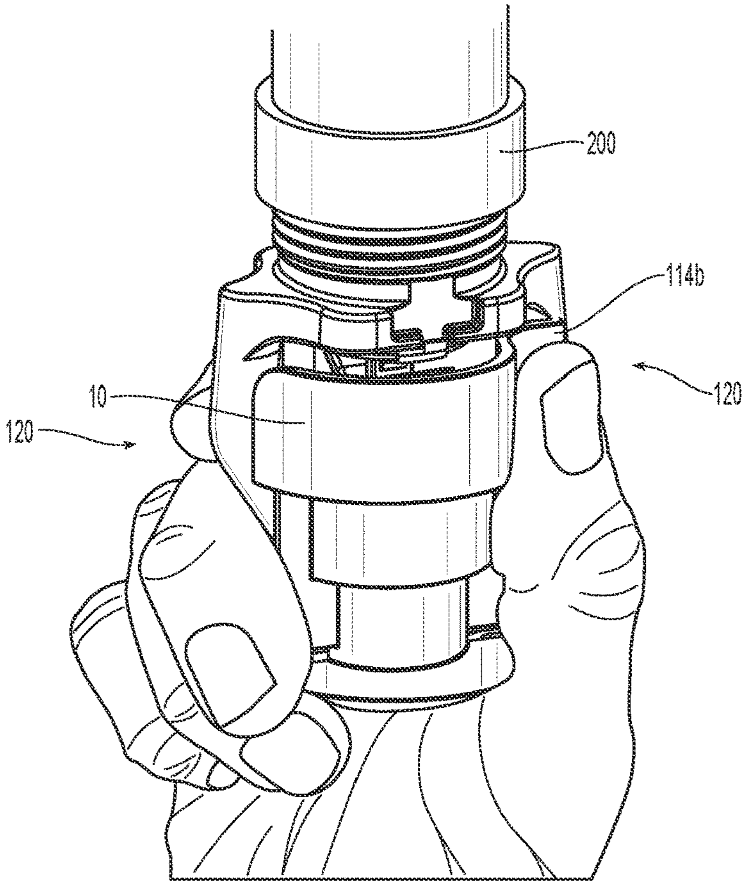
FIG. 4 is an illustration of the preferred protected sprinkler assembly in FIG. 1A being installed by hand.

Shown in FIG. 1A is an exploded partial cross-sectional view of a preferred protected sprinkler assembly 10 having a fire protection sprinkler 20 and a protective device 100 for installation in a branch connector 200 of a fluid supply pipe header 300. Preferred embodiments of the protective device 100 protects the sprinkler 20 from unintentional impact and damage during storage, transport, installation and/or when awaiting to be placed into service. Moreover, the protective device 100 also serves as a tool for installing the sprinkler 20 into the branch connector 200 of a fire protection sprinkler system. More specifically, the preferred device 100 facilitates installation of the sprinkler 20 by hand torquing the protected assembly into the branch connector 200 as illustrated in FIG. 4. Additionally, the preferred device 100 is configured for removal or release from the sprinkler 20, preferably by hand, in order to place the sprinkler 20 into service.

With reference to FIGS. 1A-1B and 2A-2B, in preferred embodiments of the protected sprinkler assembly and its installation, the sprinkler 20 generally includes a frame 30 with a body 32 and a pair of spaced apart frame arms 34*a*, 34*b* extending from and preferably diametrically disposed about the body 32. The frame arms 34*a*, 34*b* are preferably aligned with one another in plane P. A fluid deflection member 40 is coupled to the frame arms 34*a*, 34*b* and axially spaced from the body 32. The fluid deflection member 40 and the sprinkler 20 can be configured for installation as a pendent sprinkler, as shown, a horizontal sprinkler or an upright sprinkler. The sprinkler body 32 has a fluid inlet 31, a fluid outlet 33, defining an internal passageway 35 extending between the inlet 31 and the outlet 33 along a central sprinkler axis X-X. The body is configured for installation in the branch connector 200; and in preferred embodiments of the sprinkler 20, the body 32 includes an external thread formed about the central sprinkler axis X-X for a preferably threaded connection to the branch connector 200.

The sprinkler 20 is preferably an automatic sprinkler with a thermally responsive trigger assembly 50 coaxially disposed between the body 32 and the fluid deflection member 40. The trigger 50 can be embodied as a frangible glass bulb or alternatively, a solder link with strut and lever assembly as shown. The automatic fire protection sprinkler includes an internal seal assembly 39 that is supported in place by the thermally responsive trigger assembly 50 to maintain a fluid tight seal. In preferred embodiments of the sprinkler 20, the fluid deflection member 40 is affixed to an apex 34*c* coaxially aligned the central axis X-X. Alternatively, or additionally, the trigger assembly 50 and/or seal assembly 39 can incorporate an actuator for a controlled discharge. In the preferred frame 30, the frame arms 34*a*, 34*b* preferably converge to form the preferred apex 34*c*. The thermally responsive trigger assembly 50 is preferably axially supported by a threaded load screw or member 60 threaded into the apex 34*c*. Accordingly, the apex 34*c* is preferably located between the thermally responsive trigger assembly 50 and the fluid deflection member 40. When the sprinkler 20 is installed and placed in service, the trigger assembly 50 is configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflection member 40 to address the fire event.

Generally, the preferred device 100 is a protection tool configured to install and connect the sprinkler 20 to the branch connector 200. Preferred embodiments of the protective installation device 100 also include a torque assist portion 120 or features thereof that facilitate transfer of a torque, and more preferably a hand torque, to the sprinkler 20 by minimizing or eliminating rotational slip or relative rotation between the sprinkler 20 and the device 100. As described herein, the torque assist portion 120 preferably includes an external surface of the device 100 that can be used by a user to apply a gripping and rotational force to the sprinkler 20. The device 100 can remain in place to protect the installed sprinkler 20 until the sprinkler and the sprinkler system are ready to be placed into service. In order to place the sprinkler 20 into service, the protective device 100 must be removed to expose the operational components of the sprinkler 20. Preferred embodiments of the device 100 includes a releasing segment 150 to remove the protective device 100 from the sprinkler 20.

In the preferred sprinkler assembly 10, the protective and installation device 100 is disposed about the fire protection sprinkler frame 30 so as to at least partially circumscribe and protect the thermally responsive trigger 50 and even more preferably partially circumscribe and protect the fluid deflection member 40. The device 100 is preferably strapped about the sprinkler 20 so as to locate and house operative components of the sprinkler 20 within the internal protective space or void of the device 100. The protective device 100 preferably includes a first member 110*a*, a second member 110*b* in which they are shown opposed one another about a plane P in a closed configuration of the hinged arrangement with the pair of frame arms 34*a*, 34*b* preferably disposed in the plane P. Each of the preferably opposed members 110*a*, 110*b* has a first lateral end 112*a* and a second lateral end 112*b* disposed laterally about the internal void of the device 100 or the sprinkler 20 housed therein. The opposed members 110*a*, 110*b* are preferably coupled to one another about the fire protection sprinkler 20. The members 110*a*, 110*b* are either integrally formed or joined to one another. The members 110*a*, 110*b* are preferably formed from a polymer or plastic material such as, for example, polyethylene and formed by molding such as, for example, injection molding.

In one preferred aspect, the protective device 100 includes a hinge portion or connection 122 formed to connect protective member 110*a*, 110*b* to one another at opposed lateral ends 112*a*, 112*b*. The hinge portion 122 allow the members 110*a*, 110*b* to pivot with respect to one another about a hinge axis HA to define the open configuration for disposing or strapping the protective device 100 about the sprinkler 20 and define the closed configuration for affixing the protective device 100 about the sprinkler 20. To secure the device 100 about the sprinkler 20, the hinged device 100 preferably includes a releasable lock arrangement 124 to secure the hinged members 110*a*, 110*b* of the device 100 about the sprinkler 20.

Figure 3A:
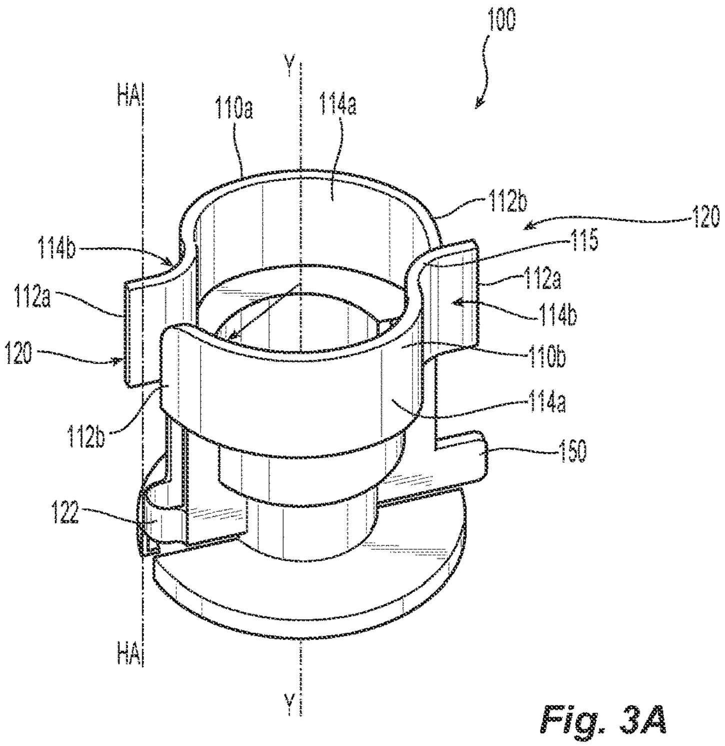
FIGS. 3A-3B are perspective views of the protective device used in the protected sprinkler assembly in FIG. 1A.
Figure 3B:
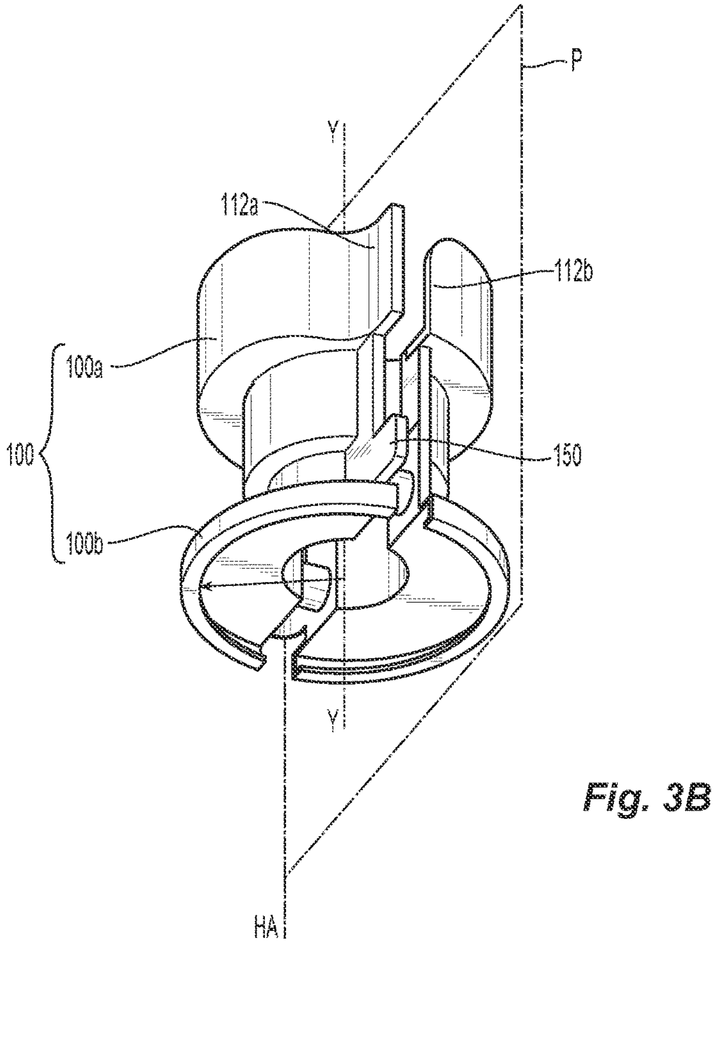
Figure 3C:
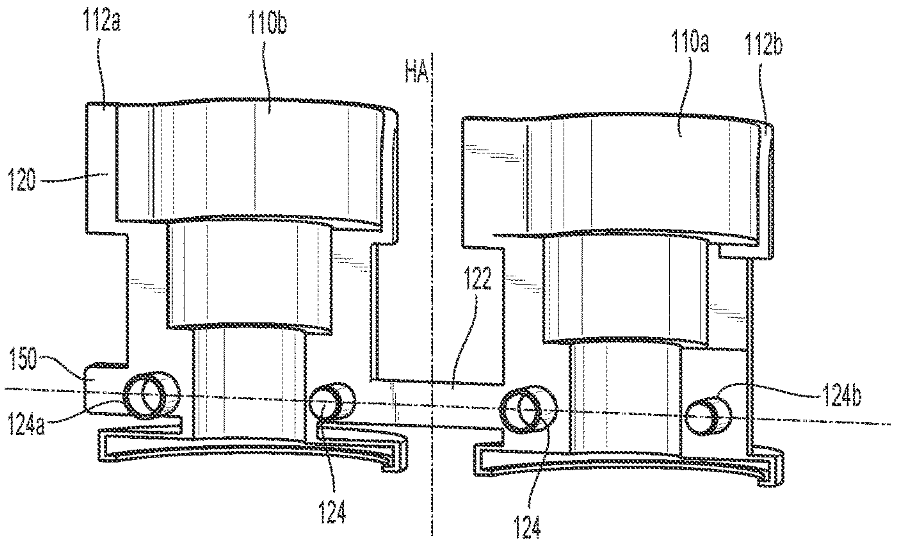
FIG. 3C is another perspective view of the protective device in FIG. 3A in an open configuration.

With reference to FIG. 3C and the view of the protective device 100 in an open configuration, the interior alternatively or additionally includes one, and preferably more than one spacer 124 between the first and second members 110*a*, 110*b*. Moreover, one or both of the spacers can form a preferred latched connection with the spacer 124 including a cylindrical insert 124*a* that engages a complementary cylindrical receiver 124*b* in a preferred frictional or interference fit to connect the members 110*a*, 110*b* to one another in the closed configuration of the device 100. In the preferred embodiment, a pair of spacers 124 are disposed laterally about the device axis; or in the assembly 10, the spacers 124 are radially disposed about each side of the apex 34*c* between the members 110*a*, 110*b*. Additionally, one or both of the preferred members 110*a*, 110*b* can include other internal formations that extend toward and preferably perpendicular to the plane P in the closed configuration of the device 100 to surround and/or contact the trigger 50. The formations preferably stabilize the protective device 100 about the frame 30 and more preferably center the trigger 50 within the device 100. The spacers 124 are preferably located radially inward with respect to the end portions 112*a*, 112*b* and in particular, located radially inward of the releasing segment 150.

Figure 2A:
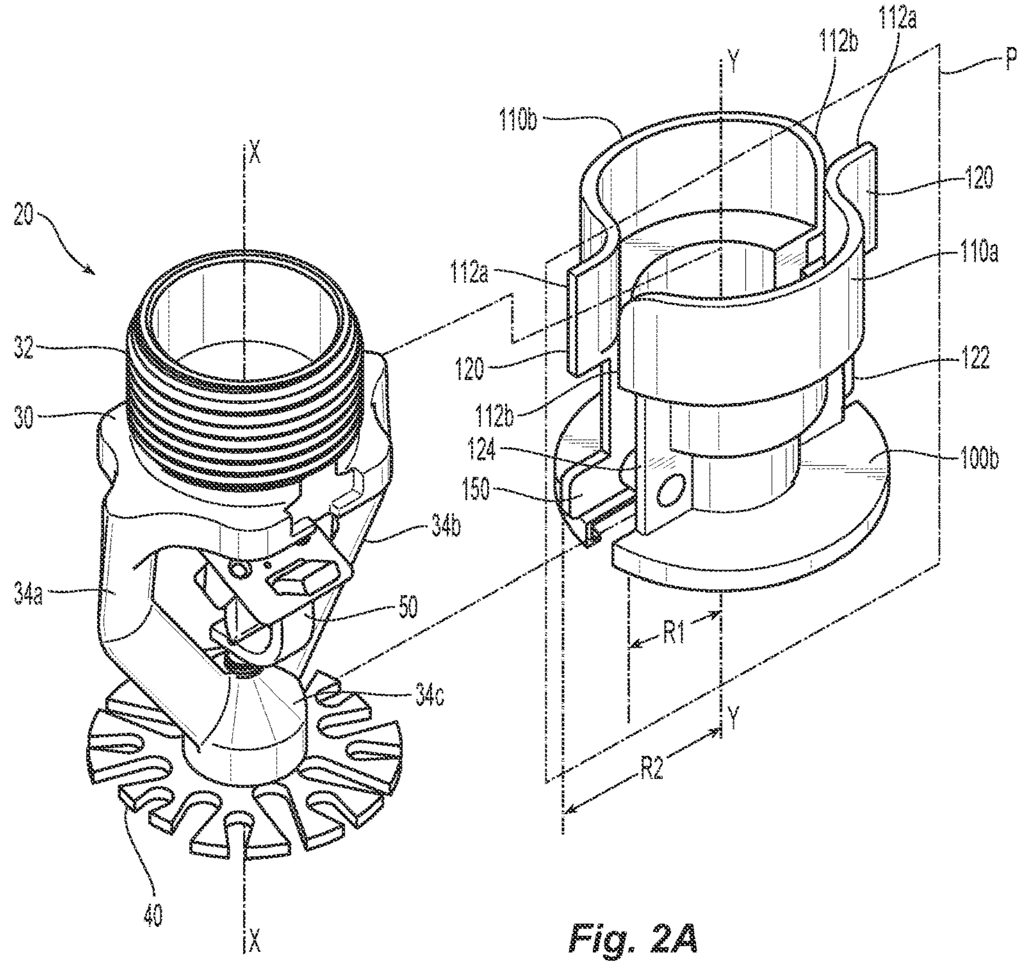
FIG. 2A is an exploded view of a preferred embodiment of the protected sprinkler assembly of FIG. 1A.
Figure 2B:
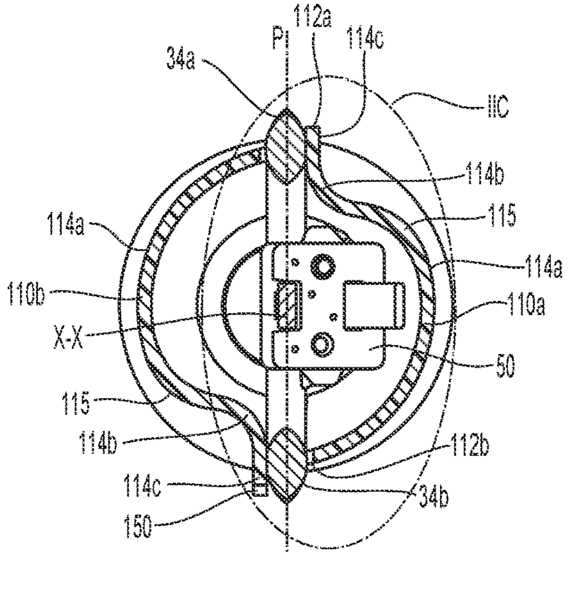
FIG. 2B is a cross-sectional plan view of the protected sprinkler assembly of FIG. 1B taken along line IIB-IIB.
Figure 2C:
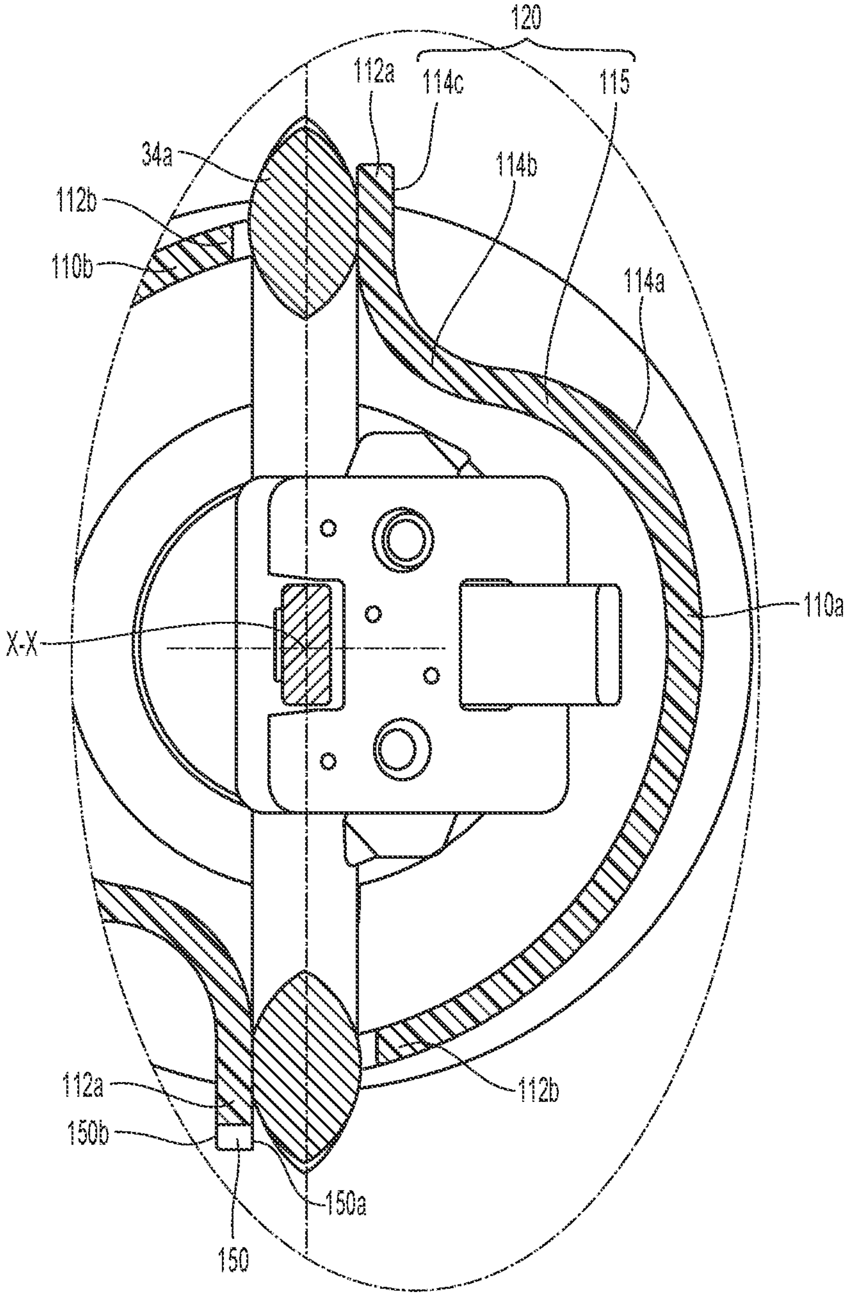
FIG. 2C is a detailed view of FIG. 2B along portion IIC.

In the closed configuration of the device 100, the spacers 124 extend perpendicularly to the plane P between the members 110*a*, 110*b* to space the members 110*a*, 110*b* apart from one another. In the preferred protected sprinkler assembly 10, the first and second members 110*a*, 110*b* are spaced apart from one another about the plane P and more particularly the opposed end portions 112*a*, 112*b* are spaced apart about the plane P for gripping the frame arms 34*a*, 34*b* therein as seen in FIG. 2B. More particularly in the preferred assembly 10, the first end portion 112*a* of the first member 110*a* and the second end 112*b* of the second member 110*b* are positioned opposite one another about the plane P with one frame arm 34*a* disposed therebetween with the second end portion 112*b* of the first member 110*a* and the first end portion 112*b* of the second member 110*b* are positioned opposite one another about the plane P with the other frame arm 34*b* disposed therebetween. In preferred embodiments of the protective device 100, the device can be grasped by hand and the two members 110*a*, 110*b* can be drawn toward one another to grip the sprinkler 20. Illustrated in FIG. 4 is the protected sprinkler assembly 10 being installed into the branch connector by hand. The preferred protective device 100 peripherally protects operative components of the sprinkler 20 including the trigger and the fluid deflection member. Accordingly, the device 100 can protect the operator's hand from the surface edges of the sprinkler 20.

Figure 1B:
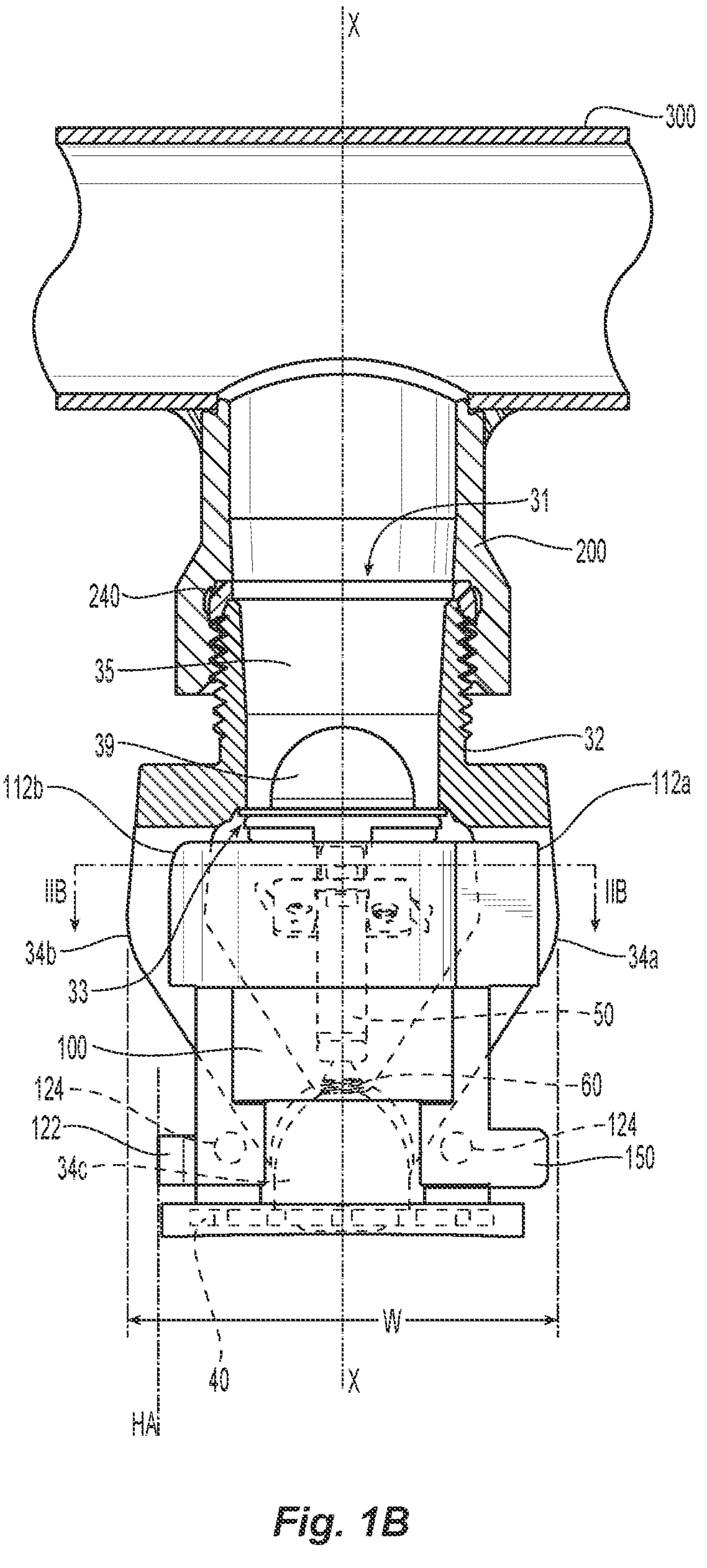
FIG. 1B is a partial cross-sectional phantom view of the protected sprinkler assembly of FIG. 1A.

Once installed, the protective device 100 can remain in place to protect the sprinkler until the system is ready to be placed into service. Once the sprinkler 20 and system are ready to be placed into service, the device 100 must be removed to expose the operational components of the sprinkler 20 for providing the desire fire sprinkler protection. To facilitate removal of the device 100 from the sprinkler 20 and in order to place the sprinkler into service, preferred embodiments of the device 100 include a releasing segment 150 to place the device 100 in an open configuration for removal from about the sprinkler 20. The releasing segment 150 is preferably configured to preferably release the preferred lock arrangement 124. Alternatively, or additionally, the releasing segment 150 is configured to open the strapped device 100 and release the device 100 from the sprinkler 20. In preferred embodiments, the releasing segment 150 is integrally formed as a segment of one of the protective members 110*a*, 110*b* preferably spaced from the hinge connection 122 to define a lever with which a force can be applied to open the device 100 and release the device 100 from its position about the sprinkler 20. As seen in FIGS. 1A-1B and 2A, the releasing segment 150 is preferably formed as a laterally extending tab 150 that is disposed laterally of the central axes X-X, Y-Y preferably opposite the hinge connection 122. The tab 150 is preferably located along the lateral end 112*a* of the protective member 110. The preferred releasing segment or tab 150 is shown as a substantially planar member extending parallel to the plane P which can be grabbed by hand and pulled to pivot the protective member 110*a* about the hinge axis HA, release the locking segment 124 and/or release the device 100 from about the sprinkler 20. The preferred planar member 150 defines an inner surface 150*a* relative to the internal void of the device 100 and an outer surface 150*b* opposite the inner surface 150*a*. A releasing segment 150 can be alternatively shaped and/or located along the protective member 110 provided that the releasing segment can be used to apply a force to open the hinged device 100. For example, the preferably planar tab member 150 can be angled or skewed with respect to the plane P. Moreover, the segment 150 can be alternatively shaped or have surface treatment so as to form a non-planar segment that can be preferably gripped by hand for releasing the device 100 from about the sprinkler 20.

In the protected assembly 10, the preferred releasing tab 150 is preferably laterally disposed so as to expose each surface 150*a*, 150*b* for grabbing or handling by a user to apply an opening force. The releasing tab 150 can be disposed relative to other components of the device 100 to facilitate release of the device 100 from the sprinkler 20. In preferred embodiments of the assembly 10 and device 100, each of the lock arrangement 124 and the releasing segment 150 are disposed laterally about the apex 34*c* opposite the hinge connection 122. Moreover, as seen in FIG. 1B, the hinge connection 122, lock arrangement 124 and releasing segment 150 are preferably aligned with one another in the lateral direction about the apex 34*c*. In the preferred embodiment shown, the hinge connection 122, lock arrangement 124 and the releasing segment 150 are axially aligned proximate or closer to the apex 34*c* than the outlet 33 of the sprinkler. Additionally, the external torque assist portion or surface 120 of the device 100 is located axially between the sprinkler outlet 33 and the apex 34*c*, preferably axially closer to the outlet 33 than to the apex 34*c*. Accordingly, the releasing segment 150, lock arrangement 124 and the hinge connection 122 are axially spaced from the preferred torque assist portion 120. In preferred embodiments, the releasing segment 150 is axially located between the fluid deflection member 40 and the at least one torque assist portion 120 and more preferably axially aligned with the torque assist portion 120 along the first lateral end 112*a* of the protective member 110*a*, 110*b*.

Each of the first and second members 110*a*, 110*b* define a geometric profile that facilitates sprinkler protection and handling of the assembly 10. In preferred embodiments described herein, the protective device 100 defines a first portion 100*a* for protecting the thermally responsive trigger 50 and preferably a second portion 100*b* for protecting the fluid deflection member 40. In preferred embodiments of the device 100, at least one of the first and second members 110*a*, 110*b* defines a shielding segment and a convex segment, with respect to the internal void of the device, having a transition therebetween to define a preferred external torque assist surface of the device. The first and second members define a first width or space therebetween to form the first portion 100*a* of the device for protecting the thermally responsive trigger 50. The first and second members 110*a*, 110*b* also preferably define a second width therebetween that is greater than the first width to form the second portion 100*b* of the device 100 for protecting the fluid deflection member 40. In at least one, and preferably both, of the protective members 110*a*, 110*b* includes a concave segment 114*a*, and a convex segment 114*b*, each defined with respect to the central sprinkler axis X-X, the internal volume of the protective device 100 or the thermally responsive trigger assembly 50 contained therein to define the shielding segment of the device 100 or portion thereof. The concave segment 114*a* is formed to partially circumscribe and shield the thermally responsive trigger assembly 50. In preferred embodiments, the concave segment 114*a* defines a variable radius about the central axis X-X. The shielding portion of the members 110*a*, 110*b* can be defined by alternate geometries about the axis X-X provided the geometry can at least partially surround and shield the trigger assembly 50.

Preferably, the convex and concave segments 114*a*, 114*b* are contiguous with one another to define a preferred inflection transition 115 of the protective member 110. For the preferred protective device 100, the transition 115 provides an external surface of the torque assist portion 120 of the device that can be used for applying a torque to the protected assembly 10 to facilitate installation of the sprinkler 20 into the branch connector 200 or other fitting. The convex segment 114*b* defines a preferred external finger rest or thumb drive against which a hand torque can be applied as illustrated in FIG. 4. Additionally, or alternatively, the external surface of the convex segment 114*b* can include other surface features to accommodate and define the preferred finger or thumb rest. In the preferred sprinkler assembly 10, the convex segment 114*b* is preferably laterally located between the thermally responsive trigger assembly 50 and one frame arm to define the preferred external torque assist surface. Accordingly, the protective device 100 provides a preferred method for protecting and installing a fire protection assembly 10 that includes shielding the thermally responsive trigger with a concave segment 114*a* of a protective member 110 relative to the central sprinkler axis X-X; and torquing the sprinkler assembly 10 into a branch connector 200 with a convex segment 114*b* of the protective member 110 relative to the central sprinkler axis X-X and located between one frame arm 34 and the trigger assembly 50.

To transfer a torque applied to the device 100 to the sprinkler 20, one and preferably both of the protective members 110*a*, 110*b* includes another segment 114*c* at one or both of the lateral ends 112*a*, 112*b* that confronts one of the frame arms 34*a*, 34*b* with an internal surface of the segment 114*c*. In preferred embodiments of the device 100, one and preferably both of the protective members 110*a*, 110*b* includes a planar segment 114*c* that confronts one of the frame arms 34*a*, 34*b* and more preferably confronts different frame arms 34*a*, 34*b*. More preferably, the planar portion 114*c* preferably extends parallel to the plane P and is preferably configured contiguously with the concave and convex segments 114*a*, 114*b* so that the convex portion 114*b* is located between the concave segment 114*a* and the planar segment 114*c*. Accordingly, the planar segment 114*c* further defines the preferred external torque assist surface 120 with the convex segment 114*b* and the preferred inflection transition 115. With reference to FIG. 2B, the preferred planar segment 114*c* of the torque assist portion 120 is located to confront the frame arm 34*a* and preferred planar releasing segment 150 extends radially outside the confronted frame arm 34*a*. Accordingly, the releasing segment 150 and the torque assist portion 120 are preferably formed integrally with the common or same protective member 110*b*. In an alternate embodiment in which the planar releasing segment 150 is skewed with respect to the plane P, the releasing segment 150 is skewed with respect to the planar portion 114*c* of the torque assist portion 120.

The protective device 100 is located axially to extend from the frame body 32 to the fluid deflection member 40. Additionally, the protective device 100 is disposed about the frame 30 to expose the wrench boss of the sprinkler frame for use of the protective device 100 in combination with a wrench to install the sprinkler. The protective device extends axially to the fluid deflection member 40 and more preferably at least peripherally surrounds the fluid deflection member 40 and even more preferably house the fluid deflection member 40. In preferred embodiments of the device 100, each of the first and second members 110*a*, 110*b* defines a first maximum radius of the first protective portion 100 from the central sprinkler axis for protecting the thermally responsive trigger 50 assembly and a second maximum radius of second protective portion 100*b* from the central sprinkler axis for protecting the fluid deflection member 40 in which the second maximum radius is preferably greater than the first radius. As seen in FIGS. 1A and 3A, the concave segment 114*a* defines the preferred first maximum radius and the first protection portion 100*a* of the device 100 preferably narrows in the axial direction toward the second protection portion 100*b*. The first portion 100*a* can narrow uniformly or more preferably narrow in a step-wise fashion as shown. With reference to FIGS. 2A-2B and 3A-3C, the second protection portion 100*b* of the device preferably includes a radially extending shielding surface disposed normal or perpendicular to the central longitudinal sprinkler axis X-X or device axis Y-Y to protect a surface of the fluid deflection member 40 opposed to the outlet 33 and a peripheral shielding surface that at least partially circumscribes the fluid deflection member 40. Where the shielding surface of the second portion 100*b* defines a first radial distance R1, the preferred releasing segment 150 is preferably formed or located at a second radial distance R2 that is preferably greater than the first radial distance R1. In the preferred embodiment shown in FIG. 3B, the second protection portion 100*b* can include a second radially extending shielding surface parallel to the first radially extending surface and normal to the central axis X-X to form a preferred lower surface or lip for shielding the fluid deflection member with the peripheral surface extending between the first and second radially extending surfaces.

Illustrated in FIG. 4 is the protected sprinkler assembly 10 being installed into the branch connector by hand. The preferred protective device 100 peripherally protects operative components of the sprinkler 20 including the trigger and the fluid deflection member. The external surface of the torque assist portion 120 provides a finger rest and more preferably a thumb rest against which the installer can exert a force to torque the sprinkler 20 into the branch connector 200. With a thumb exerted against one device member 110*a*, the remaining fingers can curl about the other device member 110*b*. Once installed, the device 100 can be removed or released from the sprinkler 20 by pulling the preferred releasing segment 150 to thereby expose operational components of the sprinkler 20 for service.

Referring again to FIGS. 1A and 1B, preferred embodiments of the protected sprinkler assembly are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflection member 40 of the sprinkler 20, the branch connector 200 can be arranged on the header 300 for appropriate installation as pendent, an upright or a sidewall/horizontal device. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member for formation of a fluid tight sealed connection with the protected sprinkler assembly 20. The branch connector 200 includes a preferred internally formed gasket chamber 230 in which an annular seal member 240 is disposed. The gasket chamber 230 is disposed between an internal passageway 16 and the internally threaded portion 220. The annular seal member 240 is preferably configured as the seal shown in U.S. Pat. No. 10,744,527 to provide a preferred leak-proof connection between a fire protection sprinkler or other fire protection device 200 and the branch connector 200. The material employed for seal member 240 is an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion proximate the outlet end 214 for coupling preferred embodiments of the protected fire protection sprinkler assembly 10 and more preferably coupling the protected sprinkler assembly 200 by hand torque using preferred embodiments of the protective device 100 described herein. The outlet end 214 and internally threaded portion 220 is preferably configured for connection with a device 20 of a nominal size. Accordingly, preferred embodiments of the branch connector 200 at the outlet end 214 define a nominal size or diameter ranging from ½ inch to 1½ inch and more particularly any one of ½ inch, ¾ inch, 1 inch, 1¼ inch or 1½ inch. The outlet end 214 is preferably defined by a circular planar surface circumscribed and disposed orthogonally with respect to the central longitudinal axis X-X.

Generally, the external thread of the body 32 of the protected fire protection sprinkler 20 is of a tapered form, for example, NPT thread. The internal threaded portion preferably includes internal straight threads for receipt of the tapered sprinkler thread of the sprinkler 20. The threaded engagement remains fluid tight by the proper sealed engagement between the seal member 240, branch connector 200 and the sprinkler 20. The internal diameter ID of the internal straight thread 220 can be defined by any one of the pitch diameter, minor diameter or major diameter of the internal thread 220 provided the straight thread engages the tapered thread of the sprinkler 20. The internal straight thread can be for example, a 1-11.5 NPSH Thread; a ¾-14 NPSH Thread; or a ½-14 NPS Thread for mating with a correspondingly nominal 1 inch, ¾ inch or ½ inch fire protection sprinkler.

Use of the preferred straight internal thread permits preferred embodiments of the protected sprinkler assembly 10 to be rotatable about the axis X-X within the branch connector 200, preferably by hand, in any desired position while forming a proper fluid tight seal. More preferably, the internal thread portion and the seal member 240 form a proper fluid tight seal engagement with the sprinkler 20 upon sufficient hand torque using preferred embodiments of the protective device 100. Threaded installation of the sprinkler 20 deforms the annular seal member 240 and provide a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics from the sprinkler body 32 is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, *NFPA* 13: *Standard for the Installation of Sprinkler Systems*, can range from 1 to 30 [GPM/(psi.)$^{1/2}$] and greater. NFPA 13 identifies the following nominal K-factors of 14 or greater: 14[GPM/(psi.)$^{1/2}$] ("K14"); 16.8[GPM/(psi.)$^{1/2}$] ("K16.8"); 19.6[GPM/(psi.)$^{1/2}$] ("K19.6"); 22.4[GPM/(psi.)$^{1/2}$] ("K22.4"); 25.2[GPM/(psi.)$^{1/2}$] ("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 200 is preferably defined between the outlet end 214 and a mid-point of the concave portion of the saddle-shaped inlet 212. The overall length L of the branch connector between the inlet end 212 and the outlet end 214 preferably ranges from 1 inch to 1½ inch. Moreover, the overall length L of the branch connector 200 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1¹⁄₁₆ inch. The preferred sprinkler assembly 10 could be used with other known branch connectors shown and described, for example, in each of U.S. Pat. Nos. 8,297,663 and 10,744,527 and U.S. Patent Publication No. 2019/0175968.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, the fire protection sprinkler including a pair of spaced apart frame arms disposed in a plane and extending axially from the body and converging toward one another to form an apex centered along the central sprinkler axis and spaced axially from the outlet, the fire protection sprinkler including a thermally responsive trigger assembly disposed along the central sprinkler axis and a fluid deflection member affixed to the apex and centered along the central sprinkler axis with the apex between the thermally responsive trigger assembly and the fluid deflection member; and a protective device disposed about the fire protection sprinkler to at least partially surround the thermally responsive trigger assembly, the protective device including:

a first protective member and a second protective member opposed from one another about the plane with at least one of the first and second protective members including an external torque assist surface of the protective device;

a releasable lock arrangement to lock the first protective member to the second protective member;

at least one releasing segment to release the releasable lock arrangement; and a hinge connection between the first and second protective members to pivot the first and second protective members with respect to one another between a closed configuration and an open configuration, wherein each of the lock arrangement and the at least one releasing segment are disposed laterally about the apex and the central sprinkler axis opposite the hinge connection, and wherein the hinge connection, lock arrangement and at least one releasing segment are aligned with one another in a lateral direction.

2. The assembly of claim 1, wherein the external torque assist surface is located axially between the outlet and the apex, the external torque assist surface is located axially closer to the outlet than to the apex with the hinge connection, lock arrangement and at least one releasing segment being axially aligned closer to the apex than the outlet.

3. The assembly of claim 1, wherein the lock arrangement is defined by a pair of spacers between the first and the second protective members that form at least one latched connection between the first and second protective members, the pair of spacers being radially disposed about the apex from one another, the at least one releasing segment being a planar member extending parallel to the plane.

4. The assembly of claim 1, wherein the hinge connection pivots the first and the second protective members about a hinge axis aligned in the plane, the at least one releasing segment being a planar member formed with one of the first and the second protective members at a radial distance from the hinge axis and extending parallel to the plane.

5. The assembly of claim 1, wherein each of the hinge connection and the at least one releasing segment are axially spaced from the external torque assist surface so as to be closer to the apex than the outlet of the sprinkler.

6. The assembly of claim 5, wherein the at least one releasing segment is axially located between the fluid deflection member and the external torque assist surface.

7. The assembly of claim 6, wherein the at least one releasing segment is axially aligned with the external torque assist surface.

8. The assembly of claim 7, wherein the external torque assist surface includes a first planar segment extending parallel to the plane and the at least one releasing segment includes a second planar segment extending parallel to the plane, the first and the second planar segments being formed integrally with the at least one of the first and second protective members such that the first planar segment confronts one frame arm and the second planar segment extends radially outside the one frame arm.

9. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, the fire protection sprinkler including a pair of spaced apart frame arms disposed in a plane and extending axially from the body and converging toward one another to form an apex centered along the central sprinkler axis and spaced axially from the outlet, the fire protection sprinkler including a thermally responsive trigger assembly disposed along the central sprinkler axis and a fluid deflection member affixed to the apex and centered along the central sprinkler axis with the apex between the thermally responsive trigger assembly and the fluid deflection member; and a protective device disposed about the fire protection sprinkler to at least partially surround the thermally responsive trigger assembly, the protective device including:

a first protective member and a second protective member opposed from one another about the plane with at least one of the first and second protective members including an external torque assist surface of the protective device;

a releasable lock arrangement to lock the first protective member to the second protective member; and at least one releasing segment to release the releasable lock arrangement, wherein each of the first and the second protective members includes a concave segment, a convex segment, and the external torque assist surface including the convex segment and a planar segment, the planar segments of the first and the second protective members confronting different arms.

10. The assembly of claim 9, wherein each of the first and second protective members includes a first portion defined by the concave segment and the external torque assist surface and a second portion defined by a radially extending shielding surface perpendicular to the central sprinkler axis and a peripheral shielding surface contiguous to the radially extending shielding surface.

11. The assembly of claim 10, wherein the first portion defines a first maximum radius from the central sprinkler axis and the second portion defines a second maximum radius from the central sprinkler axis.

12. The assembly of claim 11, wherein the concave segment defines the first maximum radius, and the peripheral shielding surface defines the second maximum radius.

13. The assembly of claim 11, wherein the second maximum radius is greater than the first maximum radius.

14. The assembly of claim 10, wherein the peripheral shielding surface at least partially circumscribes the fluid deflection member.

15. The assembly of claim 9, wherein the releasable lock arrangement includes a pair of spacers between the first and the second protective members, the pair of spacers being radially disposed about the apex, with at least one of the pair of spacers forming a latched connection between the first and the second protective members.

16. The assembly of claim 15, wherein both spacers in the pair of spacers forms a latched connection between the first and the second protective members.

17. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, the fire protection sprinkler including a pair of spaced apart frame arms disposed in a plane and extending axially from the body and converging toward one another to form an apex centered along the central sprinkler axis and spaced axially from the outlet, the fire protection sprinkler including a thermally responsive trigger assembly disposed along the central sprinkler axis and a fluid deflection member affixed to the apex and centered along the central sprinkler axis with the apex between the thermally responsive trigger assembly and the fluid deflection member; and a protective device disposed about the fire protection sprinkler to at least partially surround the thermally responsive trigger assembly, the protective device including:

a first protective member and a second protective member opposed from one another about the plane with at least one of the first and second protective members including an external torque assist surface of the protective device;

a releasable lock arrangement to lock the first protective member to the second protective member; and at least one releasing segment to release the releasable lock arrangement, wherein the releasable lock arrangement includes a pair of spacers between the first and the second protective members, the pair of spacers being radially disposed about the apex, with at least one of the pair of spacers forming a latched connection between the first and the second protective members.

18. The assembly of claim 17, wherein both spacers in the pair of spacers forms a latched connection between the first and the second protective members.

19. The assembly of claim 17, wherein each of the first and the second protective members includes a concave segment, and the external torque assist surface including a planar segment and a convex segment between the concave segment and the planar segment, the planar segments of the first and the second protective members confronting different arms.

20. The assembly of claim 19, wherein the concave segment defines a first maximum radius, and a peripheral shielding surface of each of the first and second protective members defines a second maximum radius.

21. The assembly of claim 20, wherein the second maximum radius is greater than the first maximum radius.

22. The assembly of claim 19, wherein the concave segment has a variable radius.

23. The assembly of claim 17, wherein each of the first protective member and the second protective member further includes:

a first radially extending shielding surface perpendicular to the central sprinkler axis; and a peripheral shielding surface contiguous to the radially extending shielding surface that at least partially circumscribes the fluid deflection member.

24. The assembly of claim 23, wherein each of the first protective member and the second protective member further includes:

a second radially extending shielding surface, wherein the peripheral surface extends between the first radially extending shielding surface and the second radially extending shielding surface.

25. The assembly of claim 24, wherein the second radially extending shielding surface extends from the peripheral surface toward the central sprinkler axis.

26. The assembly of claim 17, wherein the protective device further includes:

a hinge connection between the first and second protective members to pivot the first and second protective members with respect to one another between a closed configuration and an open configuration.

27. The assembly of claim 17, wherein the at least one releasing segment is axially located between the fluid deflection member and the external torque assist surface and aligned with the torque assist surface.

28. The assembly of claim 17, wherein the at least one releasing segment comprises a releasing segment on the first protective member and an additional releasing segment on the second protective member.

29. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, the fire protection sprinkler including a pair of spaced apart frame arms disposed in a plane and extending axially from the body and converging toward one another to form an apex centered along the central sprinkler axis and spaced axially from the outlet, the fire protection sprinkler including a thermally responsive trigger assembly disposed along the central sprinkler axis and a fluid deflection member affixed to the apex and centered along the central sprinkler axis with the apex between the thermally responsive trigger assembly and the fluid deflection member; and a protective device disposed about the fire protection sprinkler to at least partially surround the thermally responsive trigger assembly, the protective device including:

a first protective member and a second protective member opposed from one another about the plane with at least one of the first and second protective members including an external torque assist surface of the protective device;

a releasable lock arrangement to lock the first protective member to the second protective member; and at least one releasing segment to release the releasable lock arrangement, wherein the releasable lock arrangement includes a pair of spacers between the first and the second protective members, with at least one of the pair of spacers positioned between the outlet and the fluid deflection member and forming a latched connection between the first and the second protective members, and wherein each of the first protective member and the second protective member further includes:

a first radially extending shielding surface perpendicular to the central sprinkler axis; and a peripheral shielding surface contiguous to the radially extending shielding surface that at least partially circumscribes the fluid deflection member.

30. The assembly of claim 29, wherein the external torque assist surface includes a first planar segment extending parallel to the plane and the at least one releasing segment includes a second planar segment, the first and the second planar segments being formed integrally with the at least one of the first and second protective members such that the first planar segment confronts one frame arm and the second planar segment extends parallel to the first planar member.

31. The assembly of claim 29, wherein the pair of spacers are radially disposed about the apex.

32. The assembly of claim 29, wherein the pair of spacers are radially disposed about the frame arms.

33. The assembly of claim 29, wherein both spaces spacers in the pair of spacers forms a latched connection between the first and the second protective members.

34. The assembly of claim 29, wherein the protective device further includes:

a concave segment on each of the first and the second protective members, wherein the external torque assist surface includes a planar segment and a convex segment between the concave segment and the planar segment, the planar segments of the first and the second protective members confronting different arms; and/or a hinge connection between the first and second protective members to pivot the first and second protective members with respect to one another between a closed configuration and an open configuration.

35. The assembly of claim 29, further including:

a second radially extending shielding surface, wherein the peripheral surface extends between the first radially extending shielding surface and the second radially extending shielding surface.

36. The assembly of claim 29, wherein the at least one releasing segment comprises a releasing segment on the first protective member and an additional releasing segment on the second protective member.

37. The assembly of claim 29, wherein the fire protection sprinkler further includes a wrench boss positioned between the external thread and the outlet, and wherein the first protective member and the second protective member further include a first lateral end and a second lateral end disposed between the wrench boss and the apex of the fire protection sprinkler, and wherein the pair of spacers are disposed between the first lateral end and the second lateral end.

* * * * *